United States Patent [19]
Bishop

[11] Patent Number: 5,829,023
[45] Date of Patent: Oct. 27, 1998

[54] METHOD AND APPARATUS FOR ENCODING HISTORY OF FILE ACCESS TO SUPPORT AUTOMATIC FILE CACHING ON PORTABLE AND DESKTOP COMPUTERS

[75] Inventor: Peter B. Bishop, Sunnyvale, Calif.

[73] Assignee: Cirrus Logic, Inc., Fremont, Calif.

[21] Appl. No.: 639,016

[22] Filed: Apr. 24, 1996

Related U.S. Application Data

[60] Provisional application No. 60/001,455 Jul. 17, 1995.
[51] Int. Cl.[6] .................................................. G06F 12/00
[52] U.S. Cl. .......................... 711/118; 395/620; 711/121; 711/133; 711/136; 711/159
[58] Field of Search .................................... 395/620–622, 395/613, 444, 440, 445–449, 460–463, 481, 486, 487, 488

[56] References Cited

U.S. PATENT DOCUMENTS

| | | | |
|---|---|---|---|
| 4,703,422 | 10/1987 | Kinoshita et al. | 395/444 |
| 5,113,519 | 5/1992 | Johnson et al. | 395/617 |
| 5,136,706 | 8/1992 | Courts | 395/622 |
| 5,257,370 | 10/1993 | Letwin | 395/440 |
| 5,276,867 | 1/1994 | Keyley et al. | 395/620 |
| 5,276,872 | 1/1994 | Lomet et al. | 395/618 |
| 5,313,631 | 5/1994 | Kao | 395/620 |
| 5,333,311 | 7/1994 | Whipple, II | 395/621 |
| 5,390,318 | 2/1995 | Ramakrishnan et al. | 395/485 |
| 5,423,018 | 6/1995 | Dang et al. | 395/486 |
| 5,423,034 | 6/1995 | Cohen-Levy et al. | 395/610 |
| 5,442,771 | 8/1995 | Filepp et al. | 395/200.49 |
| 5,450,584 | 9/1995 | Sekiguchi et al. | 395/616 |
| 5,463,381 | 10/1995 | Ryu et al. | 395/610 |
| 5,499,358 | 3/1996 | Nevarez | 395/612 |
| 5,506,986 | 4/1996 | Healy | 395/620 |
| 5,584,007 | 12/1996 | Ballard | 395/440 |
| 5,584,015 | 12/1996 | Villette et al. | 395/463 |

OTHER PUBLICATIONS

Stanford Diehl, "A Smaller Version of Infinity", *Byte*, Mar. 1995.

Barry Nance, "Network Storage Economizers", *Byte*, Mar. 1995.

Morris, James H. et al.; "Andrew: A Distributed Personal Computing Enviroment;"*Communications of the ACM*Mar. 1986;vol. 29, No.:3; pp. 184–200.

Christman, R.D.; "Experience with File Migration;" Los Alamos National Laboratory Oct. 1981, pp. 1–13.

DeCosta, Bruce J. et al.; "NetGain;"NetStream, Inc.; Jul. 26, 1995, pp. 1–10.

*Primary Examiner*—Paul V. Kulik
*Attorney, Agent, or Firm*—Steven A. Shaw; Robert P. Bell

[57] ABSTRACT

A file access history attribute may be encoded and stored with a file in a computer memory. The file access history attribute may provide information as to the date of most recent access and the level of access on which date. In addition, the file access history attribute may provide information concerning recent file history (e.g., previous nine days), quarterly history (e.g., 80 days preceding the previous nine days), as well as long-term history (e.g., beyond the 80 day period). The encoding technique of the present invention may compress file access history information into a compact file access history attribute (e.g., six to twelve bytes). Disk caching software, for maintaining files in a hard drive of a local computer coupled to a network, may utilize the file access history attribute in deciding which files are to be stored in the local hard drive and which should be migrated to network storage or archive. A file history maintenance program may operate as a background job to periodically update file access histories relative to a known maintenance start date.

38 Claims, 3 Drawing Sheets

FILE 1

FILE 2

METHOD AND APPARATUS FOR ENCODING HISTORY OF FILE ACCESS TO SUPPORT AUTOMATIC FILE CACHING ON PORTABLE AND DESKTOP COMPUTERS

CROSS-REFERENCE TO RELATED APPLICATIONS

The present application claims priority from Provisional Application Ser. No. 06/001,455 entitled "Method and Apparatus for Encoding History of File Access to Support Automatic File Caching on Portable and Desktop Computers" filed Jul. 17, 1995 and incorporated herein by reference.

FIELD OF THE INVENTION

The present invention relates generally to digital computer systems and more specifically to a system for managing disk space in a digital computer system.

BACKGROUND OF THE INVENTION

In personal computer (PC) networks, much effort may be required by a user to manage disk space, both within the PC and on the network. For the purposes of this application, the term "personal computer" is intended to include desktop PCs, workstations, laptop, notebook and portable computers, so-called personal digital assistants (PDIs), palmtop computers, and the like.

In PC networks having file servers, users may need to manage disk space on file servers in addition to managing disk space on personal computers. Prior art computer systems may not retain enough information concerning file access and storage on local PCs to allow for file management of both local and network drives in one step.

A network file server may comprise one or more computers having large amounts of disk space made available for use by other computers on the network. Disk space on a file server may be accessed by other (client) computers on a network as if the file server disk was a local physical disk of a client computer. File management software may be provided to automatically manage local disk space on a PC. Such file management software may not show to a user the mount points for the local hard disk. Rather, the file management software may automatically select which of the files from the file servers will be stored on local disk.

A user may continue to decide which files will reside on which major disk unit on a file server, as well as which files should be moved to tape or floppy disk (e.g., for archive) or deleted altogether. Such file management programs may serve to cache files from a network server onto a local PC. For standard desktop PCs, workstations, and the like, such file caching routines may be relatively simple.

However, for laptop, notebook, palmtop and portable computers, PDIs and the like (collectively, "portable computers") file caching routines may be more complex, as a portable computer may be disconnected from a network on occasion. In order to determine automatically what information should be kept on a portable computer, prior art techniques for disk caching may be extended.

If a disk on a local computer is viewed as being a "cache" of files on the network file server, then automatic management of local disk space may comprise a cache management algorithm for the local disk. One of the most widely known and successful cache management strategies is called the "Least Recently Used" algorithm. The date and time of the last access of each element in the cache may be retained, typically as part of a file header on the disk. Once the cache is full and whenever a new file is needed in the cache, a file which has not been used for the longest time may be removed from the cache to make room for a new file.

There is a well-known problem with the Least Recently Used cache replacement algorithm. If a user decides to examine a large number of files on a file server, one after another, each of those files may be brought into the cache, causing another file to be removed from the cache. Once a user has examined a sufficient number of files to fill all of local disk, then none of the files remaining in the cache reflect the usage of files by the user prior to the bulk file examination operation. If a user powers off the portable computer and disconnects from the network, then the portable computer may not contain a useful set of files in the local cache for the portable computer.

To more intelligently cache files in a portable computer hard disk, a history of file access may be required. Such a file access history may allow a caching algorithm to distinguish files which are used consistently over long periods of time from files which are being accessed less consistently. A caching algorithm may then retain files which are used consistently.

A potential difficulty with this approach is that a complete history of file access could quickly become a large amount of information. Prior art file storage formats may not permit the use of large, variable length data fields for storing file access information. Thus, a requirement exists for a technique for storing a history of file access in a small, fixed, number of data bytes.

One file system to incorporate file caching onto a local disk is the Andrew File System, created at Carnegie Mellon University, now sold and developed by Transarc Corporation of Pittsburgh, Pa. The Andrew system has proven many of the basic advantages of caching files onto a local disk on client workstations. The Andrew system uses a Least Recently Used cache replacement algorithm. The Andrew File System, however, assumes that client workstations are connected to a file server by a network at all times, and thus does not readily support portable computers.

The Andrew File System allows for reading a file which is in the local cache even if it can not reach the file server temporarily. However, the Andrew File System will not allow writing to the file without communicating with the file server on which the file resides. If all of a user's files are believed to reside on a file server, a user of a portable computer may not be able to write out any files when disconnected from the network. Such a limitation may be an unacceptable restriction on a portable computer.

Users of portable computers may wish to take advantage of a file server. PC users may regard file servers as a place to copy local files. In many cases, files from a PC may be compressed when stored on a file server, making it much more difficult for other users to access such files even when found on the file server. The DOS command XCOPY has a flag which supports backing up files by copying them.

The XCOPY command makes it fairly easy to copy files onto a file server as a backup process in such a way that they are readily accessible by other users of the file server. Backed-up files may mimic the structure of files on a portable computer. This use of XCOPY allows a portable computer to be related to its file server in a limited manner.

However, such a solution may still require a user to manage local disk space on a portable computer, a labor intensive task. In order to reorganize files, a user may have to reorganize files on both the file server and on the portable computer. A user may safely delete a file from a portable computer as the file may still reside on the file server. However, in order to truly delete a file, a user must delete the file on both the file server and the portable computer. It may be easy to delete a file from the file server when trying to reduce disk utilization on the file server, only to have the file re-appear when it is copied from the portable computer back onto the file server.

Unfortunately, portable computer file systems do not provide much assistance with the above-mentioned problems. Most portable computer file systems do not even retain the date and time a file was last accessed, making it nearly impossible to implement even a Least Recently Used replacement algorithm.

Another prior art program created for portable computers, called Infinite Disk creates a file attribute indicating the date and time a file was last accessed. The file attribute may be used to implement a Least Recently Used disk management algorithm. Infinite Disk may automatically delete files when a user reboots a portable computer in order to create a pre-specified quantity of empty disk space which may be utilized to save new files.

The Infinite Disk program may copy such files to a new location before deleting them. The program may copy files onto a file server or to a floppy disk and keep track of the locations of files. If a user attempts to access a file which does not reside on local disk, the Infinite Disk program may inform the user which floppy to insert into a floppy disk drive in order to copy the file back onto the portable computer's file storage system. If a requested file has been copied onto a file server, the Infinite Disk program may give a user access to the file if the user is connected to the file server, but will not copy the file onto the local disk of the user's PC.

The Infinite Disk program provides some limited assistance to a portable computer user. However, hard disks on most portable computers are so large that it does not make much sense to try to augment the apparent size of the hard disk with floppy disks. Rather, it makes more sense to fully utilize the existing hard disk on a portable computer. If a local hard disk is not large enough for a user's requirements, then it may make more sense to install a larger hard disk than to try to extend the size of local disk with floppies.

In addition, the Infinite Disk program does not automatically cache files accessed when a user is on a network. Thus, it does not have the problem of the file cache being filled with irrelevant files by merely looking at files when connected to a network as with the Least Recently Used algorithm under the Andrew File System. The Infinite Disk program only deals with files which a user might want to have on a portable computer. Once a file has been moved off of the portable computer by the Infinite Disk program, a user must consciously move it back again. This begins to be a significant task which must be done every time a user reconnects to a network.

The Infinite Disk program also has another problem which may be severe for portable computers. Windows and DOS operating systems are sufficiently fragile that adding the Infinite Disk functionality to the system may threaten the reliability of the file system and the operating system.

FIG. 3 illustrates dates of access for two files, FILE 1 and FILE 2 for a previous three month period. FILE 1 has been consistently accessed once or twice a week for the last three months. FILE 2 has been sporadically accessed twice a month during the last three months. For a user of a portable computer, it may be more desirable to keep FILE 1 on a local hard drive and archive FILE 2 onto a system network.

However, a caching program using the Least Recently Used algorithm may keep FILE 2 on the local hard drive and archive FILE 1 on a system network. The decision on which file to cache is based upon the almost arbitrary factor of last date of access.

In summary, previous attempts to make a user more productive by automatically managing local disk space have suffered from two contradictory requirements:

1) The Least Recently Used algorithm is needed in order to place files for a portable computer onto the local disk of the portable computer.

2) The Least Recently Used algorithm should, however, not be used to manage all of the disk space on a portable computer.

SUMMARY OF THE INVENTION

To overcome the limitations of the prior art, the present invention provides a technique for creating a file attribute containing information concerning the date and frequency of use of a particular file. The file attribute may be confined to a fixed, limited size in order to remain compatible with existing operating systems. The file attribute of the present invention is carefully structured to provide the maximum amount of relevant date and frequency of use data, encoded into a minimum amount of space.

In conjunction with the present invention, disk caching software may select files from a file server coupled to a portable computer and load those files into the local hard drive of the portable computer. Files within the local hard drive of the portable computer may be deleted or moved to the file server depending upon their date of last use and frequency of use. The file caching system may operate in a manner transparent to the end user. Files having a high frequency of use may be retained on the local hard drive, regardless of their date of last use, as determined by a file caching algorithm.

Thus, when the portable computer is disconnected from the file server, the computer may continue to operate with a collection of files most likely to be accessed by a user. The user may be unaware of where a particular file is stored, or whether the portable computer is indeed coupled to the file server.

BRIEF DESCRIPTIONS OF THE DRAWINGS

DETAILED DESCRIPTION OF THE INVENTION

The descriptions herein are used as examples only illustrative of the preferred embodiment of the present invention. However, it should be noted that the methods and systems of the present invention may be applied in a similar manner in other embodiments without departing from the spirit of the invention.

Use of disk space on a portable computer may be classified in two large groups or "pools" as follows:

1) Least Recently Used Pool—Files which have migrated from a network onto the local disk, but have not been recently accessed. Such files may be managed by a Least Recently Used cache replacement algorithm.

2) Most Consistently Accessed Pool—Files which have migrated from a network onto the local disk which are consistently, but not recently accessed. These files may be managed by an algorithm which looks at the access history of each file on the portable computer over a period of time.

In order to cache files in the most consistently accessed pool, a portable computer may require that an access history be maintained even for those files which are not currently stored on the portable computer. Such an access history may comprise a figure of merit which may be assigned to each file.

Higher scores may be assigned to files which have been accessed several times each day for a month or longer. Scores will remain high for files which have been accessed several times during the last week. Scores for files that at one time were accessed heavily will begin to degrade significantly once they have not been accessed for more than a week.

The present invention uses at least one pool of local mass storage whose cache replacement algorithm depends upon information about history of file access in order to manage portable computer local mass storage. The present invention also discloses a system for designing file access history file attributes. The present invention covers all file access history file attribute systems which may use any of the methods and apparatuses described herein for designing file attributes which contain a history of file access other than the simple date and time last used file attribute.

The method and apparatus of the present invention provides an encoding of access history of a file into a compact file attribute filed which may be of great value in constructing a file caching product which may retain needed files on a portable computer in a manner superior to prior art methods. The greatest challenge for file caching products occurs when supporting portable computers connected to a LAN close to half of the time.

Figure 1:
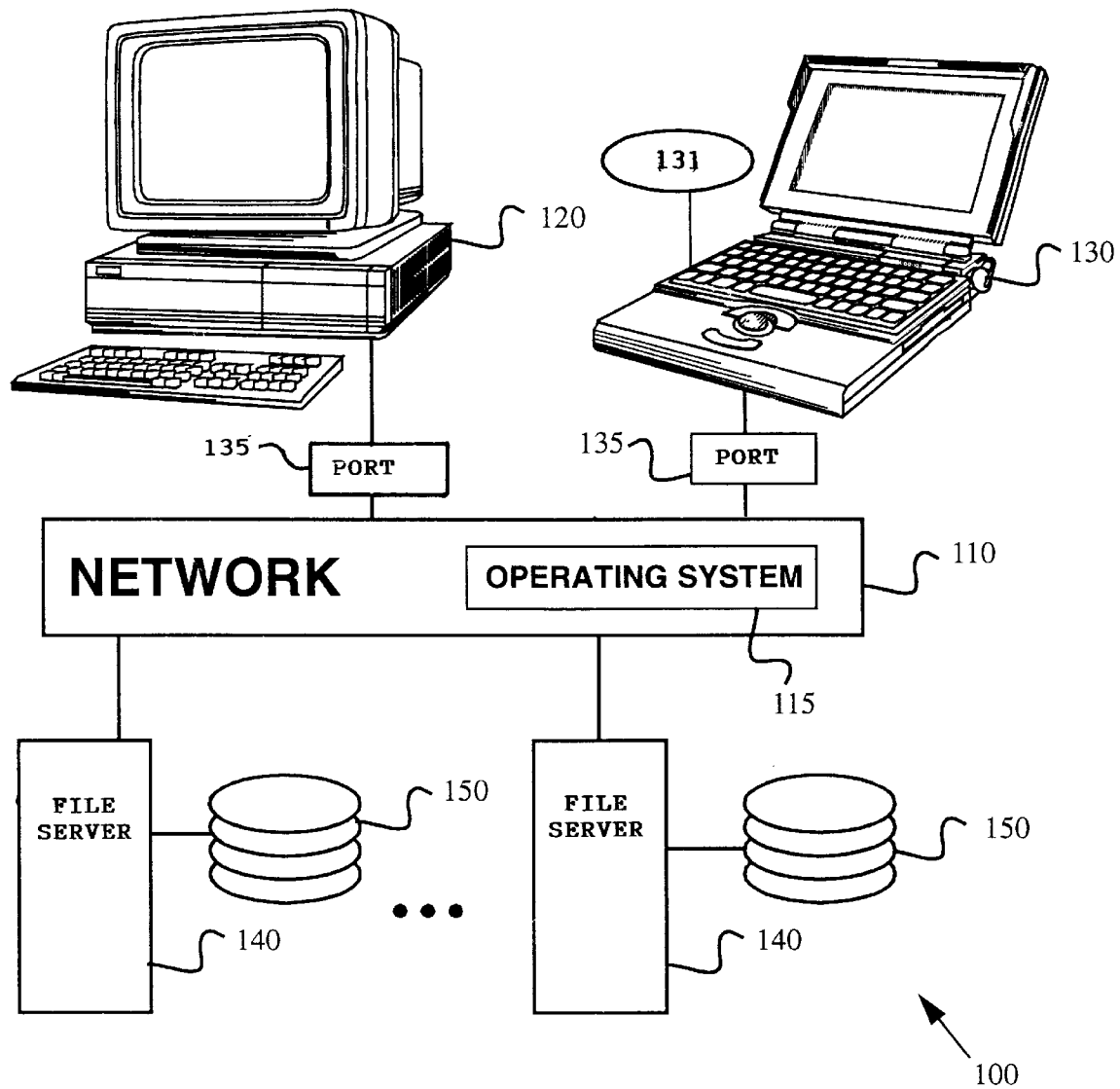
FIG. 1 is a diagram illustrating a network system including a portable computer.

FIG. 1 illustrates a typical distributed system 100 within which the present apparatus and method may operate. Distributed system 100 may include a plurality of desktop computers 120 coupled through a plurality of connection ports 135 to a computer network 110 which in turn may be coupled to a plurality of file storage servers 140 each of which may be coupled to one or more file storage unit(s) 150 (e.g., disk drive). Network 110 may include a network operating system 115 operating to allow for sharing of network resources such as file storage servers 140. When a portable computer 130, including local storage 131, is connected to network 110 through connection port 135, a user may become accustomed to assuming that immediate access is available to all information on all file storage unit(s) 150.

The power of file caching in distributed system 100 environment is that a user may not be aware of the storage management technique. A user may need only determine how much local storage 131 to acquire (i.e., select size of hard drive). The user may then assume that the automatic file caching system is sufficient such that the user may only achieve better results through unacceptable levels of effort. All files may be backed up onto network 110, and may be made available for file sharing under file access limitations implemented by network operating system 115.

If local storage 131 is large enough to store most of the files needed by the user, then a simple file caching system may work well. One problem, however, is if a user occasionally uses a wide range of data files throughout network 110 then it may be difficult to distinguish the files which should be on local storage 131 from those which should remain primarily on file storage unit(s) 150.

Files which are needed only in the long term should not be stored in local storage 131. Files which are used consistently over time should fall to the bottom of the priority list for removing from local storage 131. The present invention provides a user with an illusion that the user is connected to network 110 even when the user is not connected to network 110, without requiring attention from the user to select files which will be needed except for "new" files which a user wants to store on local storage 131 before disconnecting from network 110.

Figure 2A:
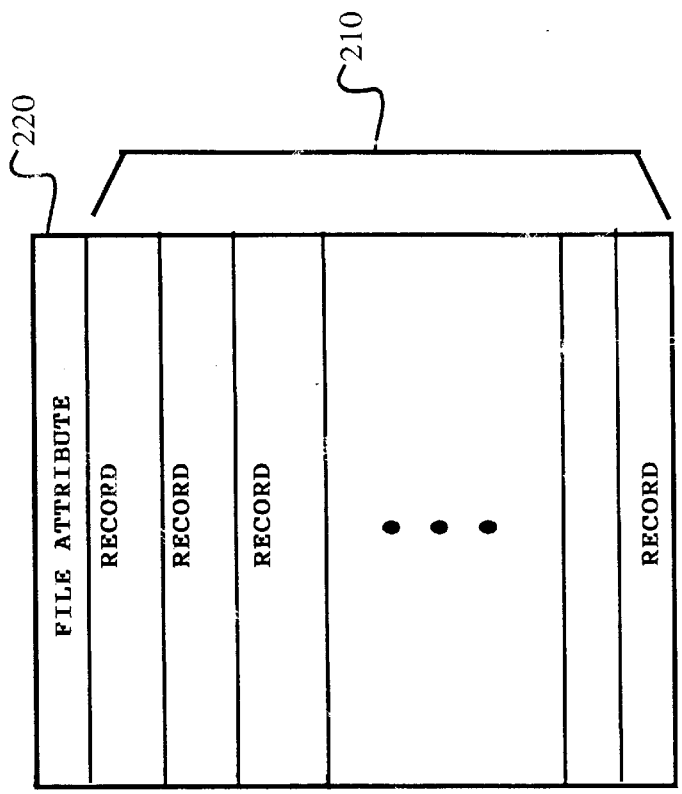
FIG. 2A is a diagram illustrating a file structure.

The present invention provides this illusion by maintaining information about the pattern of access to files stored on local storage 131 and file storage unit(s) 150. It is common in the art for local storage 131 to maintain data representing the date each file was last accessed. However, a high quality file caching system may require an entire history of access to each file. Files may contain both data and attributes. FIG. 2A is a diagram illustrating a file 200 of the present invention which may be stored in file storage unit(s) 150. File 200 may contain a plurality of data items called records 210 and a file access history attribute 220.

Figure 2B:
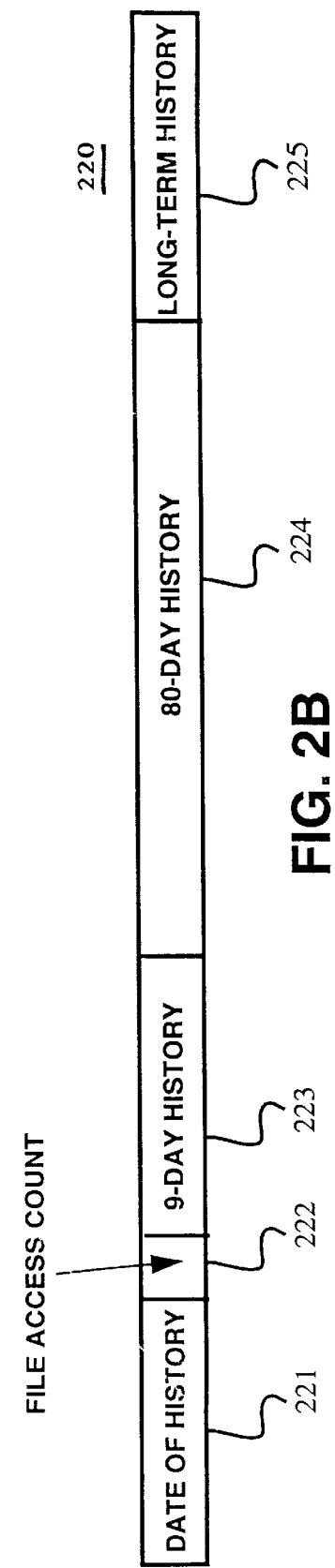
FIG. 2B is a diagram of a file access history attribute.
Figure 3:
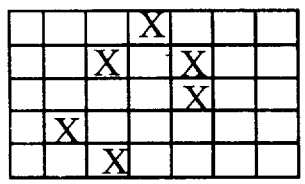
FIG. 3 is a diagram illustrating different access histories for two different files.
Figure 3:
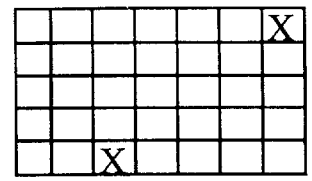
Figure 3:
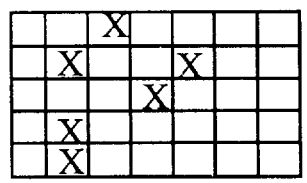
Figure 3:
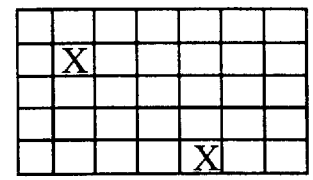
Figure 3:
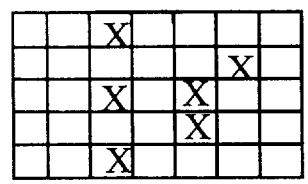
Figure 3:
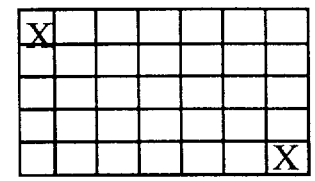
Figure 3:
Figure 3:

FIG. 2B illustrates several fields of file access history attribute 220. File access history attribute may comprise several fields; date of history field 221, file access count 222, nine-day history field 223, 80-day history 224, and long-term history 225.

File access history attribute 220 may be fixed in size. In the preferred embodiment, file access history attribute 220 may further comprise five specific file access history attributes 221, 222, 223, 224, and 225, as illustrated in FIG. 2B. Each specific file access history attribute 221, 222, 223, 224, and 225 and each may have a different size. A 96-bit or 12-byte file access history attribute 220 may utilize 16 bits for date of history field 221, four bits for file access count 222, 18 bits for nine-day history field 223, 40 bits for 80-day history field 224, and 18 bits for the long-term history 225.

A standardized application program interface to all of specific file access history attributes 221, 222, 223, 224, and 225 may allow a cache replacement algorithm to be written independent of the precise nature of file access history attribute 220 actually implemented on a computer system.

In the preferred embodiment, the present invention provides a 12-byte file access history attribute 220 which may be more than sufficient information than needed for a file caching system. However, one skilled in the art can appreciate that the method and apparatus of the present invention may be applied without undue experimentation with file caching systems to determine which portions of file history information may be more relevant than others.

Thus, file access history attribute 220 may be further compacted such that only as much file history information is retained as is needed to make file caching software work well. In an alternative embodiment, file access history attribute 220 may be implemented with a 48-bit file access history field which compares very favorably in size to the 32-bit date/time last accessed field of prior art DOS based systems.

Another advantage of file access history attribute 220 is that for heavily accessed files, file access history attribute 220 may not have to be written every time a file is accessed. Certain file attribute updates may have a higher priority to write out than others.

A rather detailed file access history may be encoded into 12 bytes if it is configured to contain more information about recent history and less information about less recent history.

Such a scheme meets the needs of file caching software, which needs fairly detailed information about recent access to a file, but can summarize the pattern of use over longer periods of time in considerably less detail.

If a file history encoding is relative to a current point in time, maintenance software may be provided (e.g., background job on portable computer 130) to perform a periodic pass over all file attributes to update file access history attribute(s) 220 and bring their encoding up to a current point in time. For most files, however, file access history attribute 220 may be updated the first time a file is accessed on any given day. Thus, most of such processing may be distributed over other calculations, and little or no additional disk writes may be needed to "shift" history information.

DATE OF HISTORY FIELD

Date of history field 221 may be as small as two bits. If periodic maintenance passes are performed over local storage 131 no more than once every other day, date of history field 221 may be reduced to two bits to represent a number of days relative to the start of the last maintenance pass. The date of the last maintenance pass may be stored as a 16-bit absolute date (i.e., day, month, year) in another file maintained by a file history maintenance background job program. Caching software may load the date of the last maintenance from that file and then deduct the date of history for individual files by adding the value from date of history field 221 to the stored date of last maintenance.

If the size of date of history field 221 is increased, the frequency of maintenance passes may be correspondingly reduced. Maintenance passes over local storage 131 may be eliminated entirely by making date of history field 221 a 16-bit absolute date last accessed field, indicating month, date, and year.

It may be useful to think of date of history field 221 in terms of two different dates:

1) The date of the beginning of the last maintenance pass over local storage 131; and
2) The date of the beginning of the current maintenance pass over local storage 131.

Part of the encoding of date of history field 221 places limits on the overall design of a file system. Two variables may be considered:

D—Represents how many days a maintenance pass over local storage 131 may be allowed to take.
B—How long between maintenance passes over local storage 131.

For variable D, usually, a day will be adequate, although two days may provide more flexibility. It is preferable that a maintenance pass over the files within local storage 131 occur in background, at a low priority. Furthermore, the present invention takes advantage of the fact that files which are accessed normally may have a file access history attribute 220 updated as part of normal file processing, without causing additional disk writes. It is more advantageous to have D as large as possible. D codes may be pre-allocated for dates during a maintenance pass over local storage 131, as any of the other codes may not be able to be used until the maintenance pass over local storage 131 is complete.

For variable B, there may be 2*D values which may be set aside for dates which occur during a maintenance pass over local storage 131. After completion of a maintenance pass, no dates remain with a date of history field 221 prior to the start of a current maintenance pass.

During the maintenance pass over local storage 131, there are three possible actions:

1) Convert the file access history of a file which has not been accessed since the beginning of the current maintenance pass over local storage 131, but was accessed recently enough so that it is not using an absolute date of access history;
2) Convert date of history field 221 to an absolute date for a file which was accessed reasonably recently, but has not been accessed for about a week, thereby preventing the need for further updates until the file is accessed again; or
3) Convert the absolute date of access from the previous epoch to the current epoch, for a very infrequently accessed file.

In order to minimize the number of file attributes modified during a maintenance pass over local storage 131, a maintenance pass over local storage 131 may be performed by first waiting for approximately a week before actually visiting any file attributes. Then, as each file attribute is visited, the only changes made during the maintenance pass over local storage 131 may be of type 2, and not of type 1.

There are B values which indicate dates more than D days after the last maintenance pass over local storage 131 began, but before the current pass. The next maintenance pass over local storage 131 must start no more than B+D days after the last maintenance pass began. B will always be at least 1.

Such a scheme may allow a 4-bit field to have D=6 and B=3, or a 5-bit field to have D=6 and B=20. A two-bit field must have D=1 and B=1.

If portable computer 130 is not used for long periods of time, there may be serious consequences during a current pass over local storage 131. Since file access history attribute 220 reflects only the current status of the local disk 130 (any file migrated to the file storage server 140 and file storage unit(s) 150 may have its date of history field 221 updated to the current date or an absolute date on the fly), it is possible to define the "days" of the date of history field 221 to actually be defined to be virtual days on which portable computer 130 was turned on at least once. These dates may then be filled into a table of dates for the codes of this field. Thus, long periods of inactivity may not force a maintenance pass over local storage 131 as soon as it is turned on.

If a maintenance pass over local storage 131 is not finished before running out of codes in date of history field 221, the present invention may artificially pretend the next day has not been reached until it has finished the maintenance pass over local storage 131. To minimize damage to file access history attribute 220 in such a case, the priority of the background task which is making the maintenance pass over local storage 131 may be increased.

The rest of the encoding of the history of file access assumes the invention is looking from the perspective of the present. Every time file access history attribute 220 is read, the present invention will immediately process date of history field 221, and adjust file access history attribute 220 to reflect the present date's perspective. Thus, file access history attribute 220 may always reflect the day on which they are viewed.

FILE ACCESS COUNT

File access count 222 may represent the number of times a file has been accessed on a current day and may comprise four bits. Once file access count 222 reaches its maximum value, it remains at that value until reset by access on a subsequent day. Values for a two-bit file access count 222 are summarized in Table I.

TABLE I

| Two-bit Value | File Access Count |
|---|---|
| 00 | 0 Access |
| 01 | 1 Accesses |
| 10 | 2 Accesses |
| 11 | 3 or more Accesses |

Thus, the number of accesses on a given date (date of history) may be compacted into as little as one bit.

NINE-DAY HISTORY FIELD

Nine-day history field 223 may represent a cumulative access history for the preceding nine days. Nine-day history field 223 may be significantly compressed, for example, to 18 bits, with each of nine days represented by two bits. In an alternative embodiment, 27 bits may be used, with each of nine days represented by three bits.

Nine-day history field 223 may be analogous to a history of access for a current week. When data from nine-day history field 223 is combined with data from file access count field 222, a history of the last 10 days of access to a file may be reconstructed with reasonable accuracy.

Nine-day history field 223 should consist of collapsed values of daily access over the previous nine-days. Actual file access count 222 may still be used to obtain information about the present day, such that information about a total of ten days of access is known. Two- and three-bit encodings may be used to encode the following range of numbers as illustrated in Table II.

Three-bit encoding may be required in order to gain good experience with file caching software. One consideration is what should be done about files which were accessed only once when portable computer 130 was on network 110. If a large numbers of files are accessed once from file storage unit(s) 150, other files which have been accessed many times recently may be deleted. It may be important to keep information about a single or double access in order to better determine details of a shorter (i.e, two-bit) encoding. Two-bit encoding may have a special code for a single access, or it may combine 1–4 accesses into a single code. Thus the scheme of Table II is by way of example only.

TABLE II

| Two-Bit Encoding | | Three-Bit Encoding | |
|---|---|---|---|
| Bits | # of Accesses | Bits | # of Accesses |
| 00 | 0 | 000 | 0 |
| 01 | 1 | 001 | 1 |
| 10 | 2 to 4 | 010 | 2 |
| 11 | >4 | 011 | 3 to 4 |
| — | — | 100 | 5 to 16 |
| — | — | 101 | 17 to 64 |
| — | — | 110 | 65 to 256 |
| — | — | 111 | >256 |

The present invention may use a 2-bit code to encode nine-day history 223 into 18 bits (i.e., 2 bits for each of the last nine-days of access). Such a scheme may work especially well with a 3-bit date of history field 221 (D=2, B=4) and 3-bit file access count 222, allowing the first three portions of file access history attribute 220 (date of history field 221, file access count 222 and nine-day history field 223) to be compacted into 24 bits instead of 48 bits.

In an alternative embodiment which may be the preferred embodiment of the present invention, a 4-bit code may be provided for three days. Three of these 4-bit codes may specify the pattern for 9 days. Three of the four bits may represent whether there is any access of the file on a corresponding day. The fourth bit may determine whether there was at least one day of significant access of the file. Encoding which represents no access at all, but significant access on at least one day may be interpreted as representing that there were at least two days of significant activity.

80-DAY HISTORY FIELD 80-day history field 224 may represent a cumulative access history, in an even more compressed form than nine-day history field 223. Data from file access count 222, nine-day history field 223 and 80-day history field 224 may be combined to reconstruct a file access history for the preceding 90 days (i.e., previous quarter). In the preferred embodiment, 80-day history field 224 may be 40 bits long.

80-day history 224 may be constructed from eight 5-bit fields, each representing file access history for a ten day period. Each 5-bit field may be readily constructed from data from file access count 222 and nine-day history field 223, which in themselves represent a ten day period.

Thus, once a detailed history has been constructed for the last 10 days, it may be fairly easy to compress such information into the essential information needed for recent, but slightly aging information. For each file, on a single day, activity may be classified into one of three activity states: no access (INACTIVITY), not a significant number of accesses (ACTIVITY), and a significant number of accesses (SIGNIFICANT ACTIVITY). Of interest to a caching program may be the length of the longest periods of inactivity within a ten day period.

These three activity states may be encoded using a 2-bit code. The present invention may distinguish activity and significant activity as being >1 and >4 accesses, respectively. A 3-bit code, however, may allow for further distinction between >1, >2, and >4 accesses. In the preferred embodiment, a 5-bit code of a ten day pattern of activity code illustrated in Table III.

In interpreting Table III, it should be noted that data of primary interest in the longest number of contiguous days in a row of inactivity within a ten day period. Thus, for example, value 01110 may indicate that the longest contiguous period of inactivity during a given ten day period was two days. There may have been several one or two day periods within that ten day period, however the longest contiguous period of inactivity was two days.

Moreover, the data encoded in the five-bit value representing a ten day period is indicative primarily of inactivity and significant activity. The values for activity may be inferred generally by subtracting the amount of potential inactivity and significant activity from 10. Thus, the values for activity are not explicitly encoded in the five-bit value, but are merely inferred, and are shown in Table III for purposes of illustration.

TABLE III

| 5 Bit | Pattern of Activity Cody (5 bits) | | |
|---|---|---|---|
| Code | INACTIVITY | ACTIVITY | SIGNIFICANT ACTIVITY |
| 00000 | 0 Days | 3–10 Days | 0–7 Days |
| 00001 | 1 Day | 6–9 Days | =<3 Days |
| 00010 | 2 C-Days | 5–8 Days | =<3 Days |
| 00011 | 3 C-Days | 6–7 Days | =<3 Days |

TABLE III-continued

| 5 Bit | Pattern of Activity Cody (5 bits) | | |
|---|---|---|---|
| Code | INACTIVITY | ACTIVITY | SIGNIFICANT ACTIVITY |
| 00100 | 1 Day | =<5 Days | 4 Days |
| 00101 | 2 C-Days | =<3 Days | 5 Days |
| 00110 | 3 C-Days | =<1 Day | 6 Days |
| 00111 | 1 Day | =<2 Days | 7 Days |
| 01000 | 2 C-Days | 0 Days | 8 Days |
| 01001 | 3 C-Days | =<3 Days | 4 Days |
| 01010 | 1 Day | =<4 Days | 5 Days |
| 01011 | 2 C-Days | =<2 Days | 6 Days |
| 01100 | 3 C-Days | 0 Days | 7 Days |
| 01101 | 1 Day | =<1 Day | 8 Days |
| 01110 | 2 C-Days | =<4 Days | 4 Days |
| 01111 | 3 C-Days | =<2 Days | 5 Days |
| 10000 | 1 Day | =<3 Days | 6 Days |
| 10001 | 2 C-Days | =<1 Day | 7 Days |
| 10010 | 0 Days | =<2 Days | 8 Days |
| 10011 | 0 Days | 1 Day | 9 Days |
| 10100 | 1 Day | 0 Days | 9 Days |
| 10101 | 0 Days | 0 Days | 10 Days |
| 10110 | 4–5 C-Days[1] | | 2–6 Days[4] |
| 10111 | 6–7 C-Days[1] | | 3–4 Days[4] |
| 11000 | 8–9 C-Days[1] | | 1–2 Days[4] |
| 11001 | 4–5 C-Days[2] | | 2–6 Days[4] |
| 11010 | 6–7 C-Days[2] | | 3–4 Days[4] |
| 11011 | 8–9 C-Days[2] | | 1–2 Days[4] |
| 11100 | 4–5 Days[3] | | 2–6 Days[4] |
| 11101 | 6–7 Days[3] | | 3–4 Days[4] |
| 11110 | 8–9 Days[3] | | 1–2 Days[4] |
| 11111 | 10 Days | 0 Days | 0 Days |

NOTE:
C-Days denote contiguous Days

The five-bit pattern of activity encoding concentrates on being able to encode a general graph of periods of inactivity and periods of significant activity for a file. With eight of these encodings (40 bits), the average of period of inactivity between periods of activity can be discovered, as well as how intense a file is accessed during periods of activity. Thus, the time when a file is in a period of inactivity may be predicted and the file can be migrated to file storage server 140 and file storage unit(s) 150 until needed.

Pattern of activity code (5 bits) may be combined with a 3-bit code specifying the average level of significant activity for those days which a file has had significant activity. If using the 3-bit code for 9-day access, and if significant activity were specified as >2 accesses per day, then 3–4 accesses may be counted as being 3 accesses, 5–16 accesses as being 8 accesses, 17–64 accesses as being 24 accesses, 65–256 accesses as being 80 accesses, and >256 accesses as being 275 accesses. Then the average number of accesses for the number of days of significant activity may be calculated, and result in (3–6), (7–12), (13–26), (27–50), (51–75), (76–100), (101–200), and >200 accesses, as encoded into 3 bits of the average level of significant activity.

UPDATING 80-DAY HISTORY

Two fields are present which contain information about periods of time in the past. In order to minimize the need to move information from one portion of these fields to another, the precise manner in which these fields are associated with dates or ranges of dates may be non-intuitive, The nine-day history field may always contain information about yesterday and the eight days prior to yesterday. The 80-day history, however, may only be upgraded once every 10 days. When the absolute date, taken as an integer is 0 modulo 10, then the information for the current day and the nine-day history is encoded into a 10 day encoding as required for the 80-day history, and is added to the beginning of the 80-day history. The oldest information that falls out of the 80-day history is incorporated into the long-term history as described in the next section.

LONG-TERM HISTORY FIELD

Long-term history 225 may characterize access history over an extended period of time. Long-term history 225 may be even further compressed than 80-day history field 224 and may be, for example, 18 bits long.

Once a full quarter of activity (i.e., 90 days) has been encoded in file access count 222, nine-day history field 223, and 80-day history field 224, then average periods of continuous inactivity and average periods of activity may be calculated and characterized. Long-term history 225 may be obtained by averaging information from the present history together with long-term history.

How encoding is performed may indicate how far back a file has been accessed as well as patterns of access. If file access history attribute 220 indicates that no recent accesses have been made, then that file probably should be on file storage unit(s) 150 rather than local storage 131.

A period of inactivity may be defined as a period of at least n days of inactivity, where n is a key parameter. A period of activity is defined as a period of activity with fewer than n days in a row of inactivity. The value of n should probably be set in the range of 3–7.

Table IV illustrates the number of bits which may be assigned for 80-day history field 224, for different total bit configurations. The arrangement of Table IV is by way of example only. Other types of arrangements may be used without departing from the spirit and scope of the present invention.

TABLE IV

| DESCRIPTION | Bits, 18-bit | Bits, 27-bit |
|---|---|---|
| Average Period of Activity | 4 | 4 |
| Average Period of Inactivity | 4 | 4 |
| Number of Periods in Average | 5 | 5 |
| Average Intensity | 0 | 3 |
| Previous Period | 0 | 4 |
| Current Intensity | 0 | 2 |
| Current Period | 4 | 4 |
| Currently Active/Inactive | 1 | 1 |

A 4-bit period values (Average period of activity, average period of inactivity, and current period) from Table IV may be encoded as illustrated in Table V, where each value represents a number or range of days.

TABLE V

| 4-bit Value | Range or Number of Days |
|---|---|
| 0000 | 1 |
| 0001 | 2 |
| 0010 | 3 |
| 0011 | 4–5 |
| 0100 | 6–7 |
| 0101 | 8–9 |
| 0110 | 10–12 |
| 0111 | 13–15 |
| 1000 | 16–19 |
| 1001 | 20–29 |
| 1010 | 30–39 |
| 1011 | 40–49 |
| 1100 | 50–59 |

TABLE V-continued

| 4-bit Value | Range or Number of Days |
| --- | --- |
| 1101 | 60–69 |
| 1110 | 70–79 |
| 1111 | >80 |

The two-bit current intensity field from Table IV (27-bit format) may represent the number or range of days of significant activity during the current period. The current period may be defined as the day 91 days before date of history 221. Currently Active/inactive bit from Table IV indicate whether the file was active or inactive during the current-period. Current intensity indicates how many days the file was Significantly Active during the period of activity.

Thus, from the information provided from Currently Active/inactive bit and Current intensity, one can determine whether there was an extended period of contiguous significant activity extending into long term history 225. Such information may be useful to illustrate whether a file has been consistently and significantly assessed for consecutive days in the past. It may be desirable to cache such files on local storage 131.

The two-bit current intensity field may be encoded as illustrated in Table VI.

TABLE VI

| Two-bit Value | Significant Activity |
| --- | --- |
| 00 | NONE |
| 01 | One Day |
| 10 | 2–4 Days |
| 11 | >4 Days |

The average intensity field of Table IV may represent the average number of contiguous days of significant activity during long term history 225 and may be encoded as illustrated in Table VI. Alternatively, the 2-bit value for average intensity may be encoded as {0, 1, 2, 6} days. When averaging, the actual number of periods up to a maximum of four is used to calculate an average intensity, then rounded up. Thus, the moving average for intensity moves more rapidly than ones for period length. The number of periods may be 1–32, with 0 being encoded as a minimum, illegal value for a period of inactivity. Table VI illustrates an alternative embodiment for encoding average intensity using three bits.

TABLE VI

| Three-bit Value | Average Intensity |
| --- | --- |
| 000 | 0.5 Days |
| 001 | 1 Day |
| 010 | 1.5 Days |
| 011 | 2 Days |
| 100 | 2.5 Days |
| 101 | 3 Days |
| 110 | 3.5 Days |
| 111 | >= 4 Days |

If there are a total of more than 32 periods, the number of periods may be set to an appropriate number such that taking the current cycle at its current length, and the total history of time assuming all previous periods were of uniform length, will give the largest number of these cycles. Such a technique may accurately count the average length for all cycles after calculating an average, causing periods of activity and inactivity to be decaying averages once there are more than eight periods.

Long term history 225 will provide the most information for files with long periods of either steady activity or steady inactivity. Long term history field 225 may provide histories of up to two years of legitimate data. The easiest way to make this more meaningful is to add additional bits to the number of periods field to ensure at least six months of data.

In an alternative embodiment, a 48-bit or 6-byte file access history attribute 220 may utilize 4 bits for date of history field 221, 3 bits for file access count 222, 12 bits for a nine-day history field 223, 16 bits for an 80-day history field 224, and 13 bits for the long-term history 225.

Note that it may be important to write out an updated file access history attribute when setting the file access count to 1 or 2 when the nine-day history field 223 is zero.

As discussed above, date of history field 221 may comprise a date on which a file access history was last updated. In order to reduce or eliminate updating file access history attribute 220 for files which are not accessed, one code, or possibly one bit in date of history field 221 may be set aside to indicate that a 16-bit (or possibly less) "absolute" encoding of the date of history is being used. If absolute encoding of the date of history is being used, date of history field 221 may encroach on some of the other fields in file access history attribute 220.

It may be important to carefully select which fields within file access history attribute 220 which may be encroached upon in order to allow infrequently accessed files to always use an absolute date. Only heavily accessed files may use a small date field to identify a date of last access. In particular, oldest days in nine-day history field 223 should be utilized first for additional absolute data bits.

In the preferred embodiment, file access count 222 and nine-day history field 223 should not be encroached upon. Whatever parts of the file access history attribute 220 are encroached upon for an absolute date may be assumed to indicate no access during this point in time. If this is not true, then an absolute date of access history may not be utilized.

Even absolute date encoding may comprise less than 16 bits. In such a case, two context-sensitive date systems may be in use. Two 16-bit absolute date values may indicate two different beginnings; one for a current epoch and one for a previous epoch. One 9-bit absolute date may allow changing of epoch every 256 days, forcing reconstruction of a file access history, even for files which have not been accessed in a long time, to about once a year.

Such updates could be done at very low priority as a background processing job within portable computer 130. It should be noted that for purposes of illustration, such a background job is discussed as being performed on portable computer 130. However, such background jobs may also be performed on other computers (e.g., desktop computer 120) where file history data or disk caching is required.

Moreover, such file histories may be maintained within files stored within file storage unit(s) 150 coupled to network 110 which in turn may run a maintenance pass program as a background job. Network 110 may use file history data to determine which files within file storage unit(s) 150 are to be archived (e.g., backup tape or the like).

Many system designers may want to simplify the design, and a cost of 16 bits per file attribute may be fine. Thus, there is a viable 96-bit (12-byte) encoding: 16-bit date of history field 221, 4-bit current file access count, 18-bit nine-day history field 223, 40-bit 80-day history field 224 with no intensity information, and 18-bit long-term history field 225.

As discussed above, the technique of the present invention may be employed both within an operating system software and/or as a background "maintenance" job, or may be employed as part of device driver software, applications software, or the like. Upon operation, the software of the present invention may determine file access history, as discussed above, upon access to a file within local storage 131, and/or as part of a background "maintenance" job. Such a maintenance job may take any number of hours, days, or even weeks to complete for the entire contents of local storage 131.

Once an updated file access history attribute 220 has been assembled, the file access history attribute 220 may be written onto local storage 131 as part of a file header. Disk caching software (optional), which may be provided as part of a package with file access history software, or may be provided as a separate package or by another vendor, may then utilize the file access history to perform disk caching on portable computer 130. With improved file access history attribute 220 available, disk caching software may more accurately cache relevant files onto local storage 131.

ACCESS FUNCTIONS

With any complex encoding, an important element is a set of access functions which allow essential information which has been encoded to be provided in a convenient manner. Several different access functions may be readily supplied. The purpose of access functions is to provide information, especially to caching algorithms and the like such that various caching algorithms using various policies can calculate a priority for each file. Low priority files may be early candidates for replacement, while high priority files may be late candidates for replacement.

Despite its inherent drawbacks, the Least Recently Used replacement algorithm performs surprisingly well in many situations. However, the Least Recently Used replacement algorithm has one major flaw; if a user accesses a large number of files at one time, then the entire cache may be filled with useless information. Thus, an improved caching algorithm may ensure files which have been used consistently are not discarded in favor of files which are used less consistently.

Access functions have significant cost if the size of information returned is large. Since the amount of information encoded about each file is substantial, it may be easy to write an access function which may return about 100 bytes of data which provides, in a simple and consistent format, access information about a file over its history. One such function may be required, but it may only be used with low frequency. The most desired access function may be one which provides a 32-bit priority in which various information is encoded in a manner which allows simple modification of the priority by modifying specific bytes or fields within the 32-bit priority.

Files in a computer may be retained according to the following priority, rated highest to lowest as follows:
1) Files used consistently ever since they were created.
2) Files used consistently recently.
3) Files not accessed recently, but used consistently over a long period of time.
4) Files created on the laptop, but not used recently.
5) Files which are needed periodically, but are not used outside of their period of time.
6) Files accessed once today.
7) Files used only once several days ago.

BASIC PRIORITY ACCESS FUNCTION

Thirty-two bit priority encoding may be created containing useful semantic information, but which may be readily manipulated by software which prefers a different prioritization of the files. The purpose of each byte may be identified, starting with the high order byte, as follows:
1) Consistency of access
   a) Accessed consistently recently, code: 3
   b) Accessed consistently, but not now, code: 2
   c) Accessed consistently, but in distant past, code: 1
   d) Never accessed consistently, code: 0
2) Intensity of use
   a) Significant activity every day
   b) % of days have significant activity—8 states, not precise
   c) Not significant activity
   d) % of days with no significant activity—8 states
3) Period of intensity
4) Period of inactivity since period of intensity—negative—makes long period of inactivity lower priority Thus, a thirty-two bit priority word may be divided into four bytes. If this is a generalization of the Least Recently Used algorithm, for a file which has been accessed today there may be ways of distinguishing the priority of different files based on consistency of access. This prioritization prefers files which have been accessed consistently at some point in time to files which have been accessed now.

A file caching algorithm may provide some significant disk space to files which have been accessed today but have not been accessed consistently. There may preferably be upper and lower limits on such allocated disk space. Utilization of such disk space may depend upon how many files have been accessed recently but not consistently and how many files have been accessed consistently.

Encoding the consistency of access may comprise an integer values 0–3. The intensity of access may comprise an integer values 0–15; 0–7 if no significant activity, giving percentage of days of activity during the period of activity, and coding 8–15 giving percentage of days of significant activity during the period of activity. Percentages are encoded semi-logarithmically, not linearly, thus code 7: 80–100%, code 6: 60–79%, code 5: 45–59%, code 4: 30–44%, code 3: 20–29%, code 2: 13–19%, code 1: 6–12%, code 0: 0–5%.

The encoding of the period of activity may comprise an integer values 0–255 giving the number of days in the period of activity. The encoding of the period of inactivity may comprise integer values 0–255, with 255 being zero days of inactivity, 254 being one day of inactivity, and 0 being 255 days of inactivity.

COMPLETE HISTORY ACCESS FUNCTION

The complete history access function may be fairly simple. File access history may be divided into two parts; the first 90 days and long-term history. For the first 90 days, a byte array may be provided containing the intensity of access on each day. For long-term history, the numbers in the encoding may be provided in a convenient form as follows:
1) Byte array for 90 days, intensity of access on each day, code 0: no access, code 1: one access, code 2: 2 accesses, code 3: 3 accesses, code 4: 4 accesses, code 5: more than 4 accesses 2) Number of long-term periods recorded
3) Average period of activity, in days
4) Average period of inactivity, in days
5) Average intensity of access
6) Current period active/inactive
7) Length of current period
8) Intensity of access in current period This representation may be independent of all of the variations between options, allowing user code to be independent of the internal representation of the history of access.

Additional functions may include the Date of History Access Function, which returns the date of history as a 16-bit integer, This function may be used to minimize the number of times calls are made to the access priority function. The Today's File Access Count Access Function may return the count of accesses occurring on today's date.

UPDATE FUNCTIONS

The operating system may need to update the history of access. There may be two basic access functions; increment access count, and update history. The increment access count function may require access to a current date as a global variable. The update history function also accesses the current date as a global variable.

One requirement for caching technology is that such functions may need to be relatively fast. Thus, for example, the 80-day history need not updated every day, but rather only once every 10 days. The nine-day history may be updated, for example, a maximum of once a day.

INCREMENT ACCESS COUNT

This function may require only one argument, namely a pointer to a history of access data structure. In addition, the increment access count may have access to the global variable comprising today's date, in the 16-bit format which may be required by history of access software. The increment access count may update the history of last access in the history of access structure, if necessary.

The Increment Access Count function should return a value of 0 if a high priority change was made to the history of access, 1 if a low-priority change was made to the history of access, and 2 if no change was made to the history of access. This information is likely to be used to determine how rapidly this file access information needs to be written onto the disk.

UPDATE HISTORY

This function may take the same argument as the increment function, a pointer to a history of access data structure. It may also use the global variable for today's date. The update history function may update the history of last access in the data structure to be today's date. The update history function may return a boolean value indicating whether it was necessary to update the structure or not.

INITIALIZE HISTORY STRUCTURE

This function is invoked when creating a new history structure. The initialize history structure may initialize a new history structure to indicate today's date, but no access. It may further take a pointer to the history of access structure.

While the preferred embodiment and various alternative embodiments of the invention have been disclosed and described herein, it may be apparent to those skilled in the art which various changes in form and detail may be made without departing from the spirit and scope of the invention.

For example, the main alternative which may be certain to contain the information needed is this 17-byte encoding; 16-bit date of history field 221, 9-bit file access count, 27-bit nine-day history field 223, 64-bit 80 day history field 224, and 18-bit long-term history field 225.

This encoding may be used for people who want to experiment in optimizing the replacement algorithm. Once the algorithm has been optimized, then the part of the encoding which is not needed can be eliminated. Thus, another eventual alternative s a 64-bit file attribute which is likely to utilize 16 bits of date of history field 221, 3 bits of access count, 18-bit nine-day history field 223, and 27 bits of long-term history field 224.

Moreover, while disclosed herein as storing file access history attribute 220 within corresponding file header, it may also be possible to store file access history attribute(s) 220 in a central file location or in another storage area.

In addition, while discussed above as being used for file access history encoding, the present invention may also be applied to databases. Another element of disk space management may reside in which portions of corporate databases are replicated in a laptop in order to allow disconnected operation of business applications. In such cases, each record may require a history of access. All of the techniques discussed above for file access history encoding may also be applied to the history of access of individual records in a database.

Some corporate databases exist outside of file systems. While smaller databases may reside entirely on a laptop or PC, larger databases may require additional storage. For such larger databases, a history of access for each locally replicated database record copy may be generated. Similarly, the techniques of the present invention may be applied to messages in a groupware discussion database or the like.

What is claimed is:

1. A method for encoding a file access history comprising the steps of:
   generating a file access history date data field representing a file access history date upon one of which a file access history and a file access for a particular file has occurred,
   generating a current access history data field representing a level of access for the particular file on the file access history date,
   generating a near term history data field representing levels of access for the particular file for a first predetermined number of days preceding the file access history date,
   combining the file access history date data field, the current access history data field, and the near term history data field into a file access history attribute, and
   storing the file access history attribute in a memory.

2. The method of claim 1, further comprising the step of generating a long term history data field representing at least average levels of access for the particular file for a long term period preceding the first predetermined number of days of the near term history,
   wherein said step of combining further comprises combining the file access history date data field, the current access history data field, the near term history data field, and the long term history data field into a file access history attribute.

3. The method of claim 2, further comprising the step of generating a quarterly history data field representing levels of access for the particular file for a second predetermined number of days preceding the first predetermined number of days of the near term history but after the long term period of the long term history, wherein said step of combining further comprises combining the file access history date data field, the current access history data field, the near term history data field, and the long term history data field into a file access history attribute.

4. The method of claim 1, wherein said step of generating a file access history date data field comprises the steps of:

reading a file maintenance history start date absolute date data field stored in a memory, reading a current date absolute date data field stored in a memory, calculating a difference between the current data and the file maintenance history start date, and storing the difference as a relative file access history date upon one of which a file access history and a file access for the particular file has occurred.

5. The method of claim 3, wherein said step of generating a near term history data field comprises the steps of:

retrieving a previously stored file access history date data field representing a file access history date upon one of which a file access history and a file access for the particular file had occurred, retrieving a current date absolute date data field stored in a memory, retrieving a previously stored current access history data field representing a level of access for the particular file on the previously stored file access history date, retrieving a previously stored near term history data field representing levels of access for the particular file for the first predetermined number of days preceding the previous file access history date, and generating, from the previously stored current access history data field and the previously stored near term history data field, a near term history data field representing levels of access for the file for the first predetermined number of days preceding the current date.

6. The method of claim 5, wherein said step of generating a long term history data field comprises the steps of:

retrieving a previously stored file access history date data field representing a file access history date upon one of which a file access history and a file access for the particular file had occurred, retrieving a current date absolute date data field stored in a memory, retrieving a previously stored current access history data field representing a level of access for the particular file on the previously stored file access history date, retrieving a previously stored near term history data field representing levels of access for the particular file for a first predetermined number of days preceding the previously stored file access history date, retrieving a previously stored long term history data field representing levels of access for the particular file for the long term period preceding the previously stored near term history, and generating, from the previously stored current access history data field, the previously stored near term history data field, and the previously stored long term history, a long term history data field representing levels of access for the particular file for the second predetermined number of days preceding the first predetermined number of days preceding the current date.

7. The method of claim 5, wherein said step of generating a quarterly history data field comprises the steps of:

retrieving a previously stored file access history date data field representing a file access history date upon one of which a file access history and a file access for the particular file had occurred, retrieving a current date absolute date data field stored in a memory, retrieving a previously stored current access history data field representing a level of access for the particular file on the previously stored file access history date, retrieving a previously stored near term history data field representing levels of access for the particular file for a first predetermined number of days preceding the previously stored file access history date, retrieving a previously stored quarterly history data field representing levels of access for the particular file for the second predetermined number of days preceding the first predetermined number of days of the previously stored near term history but after the long term period of the previously stored long term history, and generating, from the previously stored current access history data field, the previously stored near term history data field, and the previously stored quarterly history, a quarterly history data field representing levels of access for the particular file for the second predetermined number of days preceding the first predetermined number of days preceding the current date.

8. The method of claim 7, wherein said step of generating a long term history data field comprises the steps of:

retrieving a previously stored file access history date data field representing a file access history date upon one of which a file access history and a file access for the particular file had occurred, retrieving a current date absolute date data field stored in a memory, retrieving a previously stored current access history data field representing a level of access for the particular file on the previously stored file access history date, retrieving a previously stored near term history data field representing levels of access for the particular file for a first predetermined number of days preceding the previously stored file access history date, retrieving a previously stored quarterly history data field representing levels of access for the particular file for the second predetermined number of days preceding the first predetermined number of days of the previously stored near term history but after the long term period of the previously stored long term history, retrieving a previously stored long term history data field representing levels of access for the particular file for the long term period preceding the first predetermined number of days of the previously stored near term history and preceding the second predetermined number of days of the previously stored quarterly history, and generating, from the previously stored current access history data field, the previously stored near term history data field, the previously stored quarterly history, and the previously stored long term history, a long term history data field representing at least average levels of access for the particular file for a long term period preceding the first predetermined number of days and the second predetermined number of days preceding the current date.

9. The method of claim 8, wherein said step of generating a long term history data field further comprises the step of:

generating, from the previously stored current access history data field, the previously stored near term history data field, the previously stored quarterly history, and the previously stored long term history, a long term history data field further representing a level of access and continuous length of which level of access for the particular file for a period ending on the day preceding the first predetermined number of days and the second predetermined number of days preceding the current date.

10. The method of claim 9, wherein the first predetermined number of days comprises nine days, and the near term history data field comprises nine pairs of bits of data, each pair of bits within the nine pairs of bits representing a level of access of one of nine days preceding the file access history date.

11. The method of claim 10, wherein the second predetermined number of days comprises 80 days, and the quarterly history data field comprises eight groups of five bits of data, each five bits of data representing levels of access for the particular file for a ten day period during the 80 days preceding the first predetermined number of days of the near term history but after the long term period of the long term history.

12. The method of claim 11, wherein the long term history data field comprises eighteen bits of data, said eighteen bits of data comprising:

four bits of data representing an average length of contiguous periods of inactivity within the long term period, four bits of data representing an average length of contiguous periods of activity within the long term period, five bits representing the total number of periods sampled in the long term period, four bits representing the length of the period ending on the day preceding the first predetermined number of days and the second predetermined number of days preceding the current date, and one bit representing the level of activity during the period ending on the day preceding the first predetermined number of days and the second predetermined number of days preceding the current date.

13. A series of operational steps to be performed as a background computer job for updating a file history attribute, comprising the steps of:

generating a file maintenance history start date absolute date data field representing a start date of the background computer job, storing a file maintenance history start date absolute date data field in a memory, accessing, in a sequence, a number of files stored in a memory of a computer, said accessing sequence comprising the steps of:

retrieving a file history attribute header, including a relative file access history date and a file access history, from a file, reading the file maintenance history start date absolute date data field from the memory, reading a current date absolute date data field stored in a memory, calculating a difference between the current data and the file maintenance history start date, storing the difference in the file header as a new relative file access history date, recalculating the file access history relative to the current date to produce an updated file access history, and storing the recalculated file access history in the file header.

14. A computer-readable memory for directing a computer to generate a file access history when used by the computer, sail computer-readable memory comprising:

a first instruction portion for generating a file access history date data field representing a file access history date upon one of which a file access history and a file access for a particular file has occurred;

a second instruction portion for generating a current access history data field representing a level of access for the particular file on the file access history date;

a third instruction portion for generating a near term history data field representing levels of access for the particular file for a first predetermined number of days preceding the file access history date;

a fourth instruction portion for combining the file access history date data field, the current access history data field, and the near term history data field into a file access history attribute; and a fifth instruction portion for storing the file access history attribute in a memory.

15. The computer-readable memory of claim 14, further comprising:

a sixth instruction portion for generating a long term history data field representing at least average levels of access for the particular file for a long term period preceding the first predetermined number of days of the near term history;

wherein said fourth instruction portion for combining further comprises instructions for combining the file access history date data field, the current access history data field, the near term history data field, and the long term history data field into a file access history attribute.

16. The computer-readable memory of claim 15, further comprising:

a seventh instruction portion for generating a quarterly history data field representing levels of access for the particular file for a second predetermined number of days preceding the first predetermined number of days of the near term history but after the long term period of the long term history, wherein said fourth instruction portion for combining further comprises instructions for combining the file access history date data field, the current access history data field, the near term history data field, and the long term history data field into a file access history attribute.

17. The computer-readable memory of claim 14, wherein said first instruction portion for generating a file access history date data field comprises:

an sixth instruction portion for reading a file maintenance history start date absolute date data field stored in a memory;

a seventh instruction portion for reading a current date absolute date data field stored in a memory;

a ninth instruction portion for calculating a difference between the current data and the file maintenance history start date; and a tenth instruction portion for storing the difference as a relative file access history date upon one of which a file access history and a file access for the particular file has occurred.

18. The computer-readable memory of claim 16, wherein said third instruction portion for generating a near term history data field comprises:
   an eighth instruction portion for retrieving a previously stored file access history date data field representing a file access history date upon one of which a file access history and a file access for the particular file had occurred;
   a ninth instruction portion for retrieving a current date absolute date data field stored in a memory;
   a tenth instruction portion for retrieving a previously stored current access history data field representing a level of access for the particular file on the previously stored file access history date;
   an eleventh instruction portion for retrieving a previously stored near term history data field representing levels of access for the particular file for the first predetermined number of days preceding the previous file access history date; and
   a twelfth instruction portion for generating, from the previously stored current access history data field and the previously stored near term history data field, a near term history data field representing levels of access for the file for the first predetermined number of days preceding the current date.

19. The computer-readable memory of claim 18, wherein said sixth instruction portion for generating a long term history data field comprises:
   a thirteenth instruction portion for retrieving a previously stored file access history date data field representing a file access history date upon one of which a file access history and a file access for the particular file had occurred;
   an fourteenth instruction portion for retrieving a current date absolute date data field stored in a memory;
   a fifteenth instruction portion for retrieving a previously stored current access history data field representing a level of access for the particular file on the previously stored file access history date;
   a sixteenth instruction portion for retrieving a previously stored near term history data field representing levels of access for the particular file for a first predetermined number of days preceding the previously stored file access history date;
   a seventeenth instruction portion for retrieving a previously stored long term history data field representing levels of access for the particular file for the long term period preceding the previously stored near term history; and
   an eighteenth instruction portion for generating, from the previously stored current access history data field, the previously stored near term history data field, and the previously stored long term history, a long term history data field representing levels of access for the particular file for the second predetermined number of days preceding the first predetermined number of days preceding the current date.

20. The computer-readable memory of claim 18, wherein said seventh instruction portion for generating a quarterly history data field comprises:
   a thirteenth instruction portion for retrieving a previously stored file access history date data field representing a file access history date upon one of which a file access history and a file access for the particular file had occurred;
   a fourteenth instruction portion for retrieving a current date absolute date data field stored in a memory;
   a fifteenth instruction portion for retrieving a previously stored current access history data field representing a level of access for the particular file on the previously stored file access history date;
   a sixteenth instruction portion for retrieving a previously stored near term history data field representing levels of access for the particular file for a first predetermined number of days preceding the previously stored file access history date;
   a seventeenth instruction portion for retrieving a previously stored quarterly history data field representing levels of access for the particular file for the second predetermined number of days preceding the first predetermined number of days of the previously stored near term history but after the long term period of the previously stored long term history; and
   an eighteenth instruction portion for generating, from the previously stored current access history data field, the previously stored near term history data field, and the previously stored quarterly history, a quarterly history data field representing levels of access for the particular file for the second predetermined number of days preceding the first predetermined number of days preceding the current date.

21. The computer-readable memory of claim 20, wherein said sixth instruction portion for generating a long term history data field comprises:
   a nineteenth instruction portion for retrieving a previously stored file access history date data field representing a file access history date upon one of which a file access history and a file access for the particular file had occurred;
   a twentieth instruction portion for retrieving a current date absolute date data field stored in a memory;
   a twenty-first instruction portion for retrieving a previously stored current access history data field representing a level of access for the particular file on the previously stored file access history date;
   a twenty-second instruction portion for retrieving a previously stored near term history data field representing levels of access for the particular file for a first predetermined number of days preceding the previously stored file access history date;
   a twenty-third instruction portion for retrieving a previously stored quarterly history data field representing levels of access for the particular file for the second predetermined number of days preceding the first predetermined number of days of the previously stored near term history but after the long term period of the previously stored long term history;
   a twenty-fourth instruction portion for retrieving a previously stored long term history data field representing levels of access for the particular file for the long term period preceding the first predetermined number of days of the previously stored near term history and preceding the second predetermined number of days of the previously stored quarterly history; and
   a twenty-fifth instruction portion for generating, from the previously stored current access history data field, the previously stored near term history data field, the previously stored quarterly history, and the previously stored long term history, a long term history data field representing at least average levels of access for the particular file for a long term period preceding the first predetermined number of days and the second predetermined number of days preceding the current date.

22. The computer-readable memory of claim 21, wherein said sixth instruction portion for generating a long term history data field further comprises:

a twenty-sixth instruction portion for generating, from the previously stored current access history data field, the previously stored near term history data field, the previously stored quarterly history, and the previously stored long term history, a long term history data field further representing a level of access and continuous length of which level of access for the particular file for a period ending on the day preceding the first predetermined number of days and the second predetermined number of days preceding the current date.

23. The computer-readable memory of claim 22, wherein the first predetermined number of days comprises nine days, and the near term history data field comprises nine pairs of bits of data, each pair of bits within the nine pairs of bits representing a level of access of one of nine days preceding the file access history date.

24. The computer-readable memory of claim 23, wherein the second predetermined number of days comprises 80 days, and the quarterly history data field comprises eight groups of five bits of data, each five bits of data representing levels of access for the particular file for ten day period during the 80 days preceding the first predetermined number of days of the near term history but after the long term period of the long term history.

25. The computer-readable memory of claim 24, wherein the long term history data field comprises eighteen bits of data, said eighteen bits of data comprising:

four bits of data representing an average length of contiguous periods of inactivity within the long term period, four bits of data representing an average length of contiguous periods of activity within the long term period, five bits representing the total number of periods sampled in the long term period, four bits representing the length of the period ending on the day preceding the first predetermined number of days and the second predetermined number of days preceding the current date, and one bit representing the level of activity during the period ending on the day preceding the first predetermined number of days and the second predetermined number of days preceding the current date.

26. A method for encoding a record access history comprising the steps of:

generating a record access history date data field representing a record access history date upon one of which a record access history and a record access for a particular record has occurred, generating a current access history data field representing a level of access for the particular record on the record access history date, generating a near term history data field representing levels of access for the particular record for a first predetermined number of days preceding the record access history date, combining the record access history date data field, the current access history data field, and the near term history data field into a record access history attribute, and storing the record access history attribute in a memory.

27. The method of claim 26, further comprising the step of generating a long term history data field representing at least average levels of access for the particular record for a long term period preceding the first predetermined number of days of the near term history, wherein said step of combining further comprises combining the record access history date data field, the current access history data field, the near term history data field, and the long term history data field into a record access history attribute.

28. The method of claim 27, further comprising the step of generating a quarterly history data field representing levels of access for the particular record for a second predetermined number of days preceding the first predetermined number of days of the near term history but after the long term period of the long term history, wherein said step of combining further comprises combining the record access history date data field, the current access history data field, the near term history data field, and the long term history data field into a record access history attribute.

29. The method of claim 26, wherein said step of generating a record access history date data field comprises the steps of:

reading a record maintenance history start date absolute date data field stored in a memory, reading a current date absolute date data field stored in a memory, calculating a difference between the current data and the record maintenance history start date, and storing the difference as a relative record access history date upon one of which a record access history and a record access for the particular record has occurred.

30. The method of claim 28, wherein said step of generating a near term history data field comprises the steps of:

retrieving a previously stored record access history date data field representing a record access history date upon one of which a record access history and a record access for the particular record had occurred, retrieving a current date absolute date data field stored in a memory, retrieving a previously stored current access history data field representing a level of access for the particular record on the previously stored record access history date, retrieving a previously stored near term history data field representing levels of access for the particular record for the first predetermined number of days preceding the previous record access history date, and generating, from the previously stored current access history data field and the previously stored near term history data field, a near term history data field representing levels of access for the record for the first predetermined number of days preceding the current date.

31. The method of claim 30, wherein said step of generating a long term history data field comprises the steps of:

retrieving a previously stored record access history date data field representing a record access history date upon one of which a record access history and a record access for the particular record had occurred, retrieving a current date absolute date data field stored in a memory, retrieving a previously stored current access history data field representing a level of access for the particular record on the previously stored record access history date, retrieving a previously stored near term history data field representing levels of access for the particular record for a first predetermined number of days preceding the previously stored record access history date, retrieving a previously stored long term history data field representing levels of access for the particular record for the long term period preceding the previously stored near term history, and generating, from the previously stored current access history data field, the previously stored near term history data field, and the previously stored long term history, a long term history data field representing levels of access for the particular record for the second predetermined number of days preceding the first predetermined number of days preceding the current date.

32. The method of claim 30, wherein said step of generating a quarterly history data field comprises the steps of:

retrieving a previously stored record access history date data field representing a record access history date upon one of which a record access history and a record access for the particular record had occurred, retrieving a current date absolute date data field stored in a memory, retrieving a previously stored current access history data field representing a level of access for the particular record on the previously stored record access history date, retrieving a previously stored near term history data field representing levels of access for the particular record for a first predetermined number of days preceding the previously stored record access history date, retrieving a previously stored quarterly history data field representing levels of access for the particular record for the second predetermined number of days preceding the first predetermined number of days of the previously stored near term history but after the long term period of the previously stored long term history, and generating, from the previously stored current access history data field, the previously stored near term history data field, and the previously stored quarterly history, a quarterly history data field representing levels of access for the particular record for the second predetermined number of days preceding the first predetermined number of days preceding the current date.

33. The method of claim 32, wherein said step of generating a long term history data field comprises the steps of:

retrieving a previously stored record access history date data field representing a record access history date upon one of which a record access history and a record access for the particular record had occurred, retrieving a current date absolute date data field stored in a memory, retrieving a previously stored current access history data field representing a level of access for the particular record on the previously stored record access history date, retrieving a previously stored near term history data field representing levels of access for the particular record for a first predetermined number of days preceding the previously stored record access history date, retrieving a previously stored quarterly history data field representing levels of access for the particular record for the second predetermined number of days preceding the first predetermined number of days of the previously stored near term history but after the long term period of the previously stored long term history, retrieving a previously stored long term history data field representing levels of access for the particular record for the long term period preceding the first predetermined number of days of the previously stored near term history and preceding the second predetermined number of days of the previously stored quarterly history, and generating, from the previously stored current access history data field, the previously stored near term history data field, the previously stored quarterly history, and the previously stored long term history, a long term history data field representing at least average levels of access for the particular record for a long term period preceding the first predetermined number of days and the second predetermined number of days preceding the current date.

34. The method of claim 33, wherein said step of generating a long term history data field further comprises the step of:

generating, from the previously stored current access history data field, the previously stored near term history data field, the previously stored quarterly history, and the previously stored long term history, a long term history data field further representing a level of access and continuous length of which level of access for the particular record for a period ending on the day preceding the first predetermined number of days and the second predetermined number of days preceding the current date.

35. The method of claim 34, wherein the first predetermined number of days comprises nine days, and the near term history data field comprises nine pairs of bits of data, each pair of bits within the nine pairs of bits representing a level of access of one of nine days preceding the record access history date.

36. The method of claim 35, wherein the second predetermined number of days comprises 80 days, and the quarterly history data field comprises eight groups of five bits of data, each five bits of data representing levels of access for the particular record for ten day period during the 80 days preceding the first predetermined number of days of the near term history but after the long term period of the long term history.

37. The method of claim 36, wherein the long term history data field comprises eighteen bits of data, said eighteen bits of data comprising:

four bits of data representing an average length of contiguous periods of inactivity within the long term period, four bits of data representing an average length of contiguous periods of activity within the long term period, five bits representing the total number of periods sampled in the long term period, four bits representing the length of the period ending on the day preceding the first predetermined number of days and the second predetermined number of days preceding the current date, and one bit representing the level of activity during the period ending on the day preceding the first predetermined number of days and the second predetermined number of days preceding the current date.

38. The method of claim 26, wherein the record comprises a message.

* * * * *